April 11, 1961     P. STELLER     2,979,366
BICYCLE SPROCKET WHEEL ASSEMBLY

Filed Sept. 10, 1958     2 Sheets-Sheet 1

*INVENTOR.*
PHILIP STELLER
BY
ATTORNEY

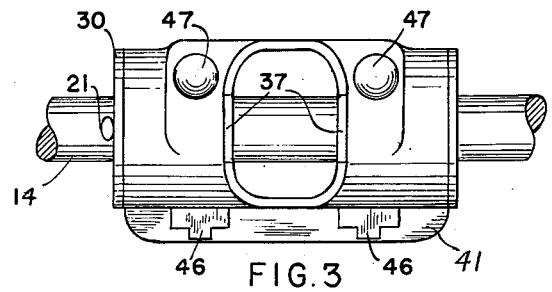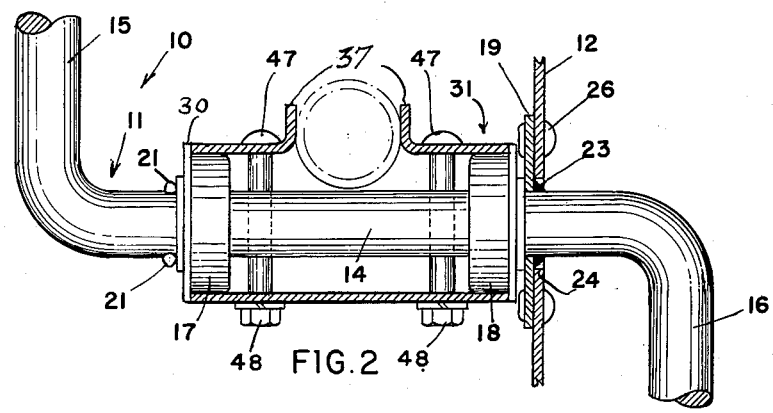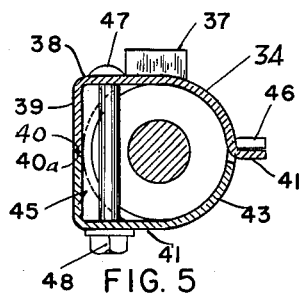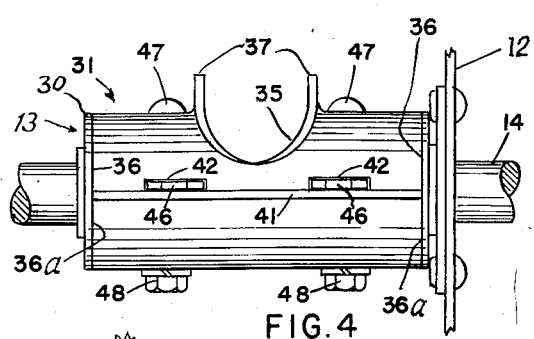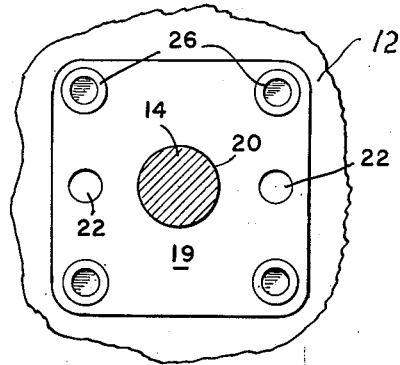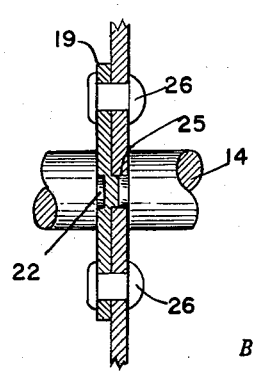
INVENTOR.
PHILIP STELLER
BY Philip G. Hilbert
ATTORNEY

2,979,366

BICYCLE SPROCKET WHEEL ASSEMBLY

Philip Steller, Great Neck, N.Y., assignor to Stelber Cycle Corporation, Brooklyn, N.Y., a corporation of New York Filed Sept. 10, 1958, Ser. No. 760,132

8 Claims. (Cl. 308—179.5)

This invention relates to a sprocket wheel assembly, and more particularly concerns a pedal wheel assembly for velocipedes.

Conventional pedal sprocket wheel assemblies comprise a large number of components and elements, which involve substantial assembly operations and correspondingly large production costs.

Accordingly, an object of this invention is to provide an improved pedal sprocket wheel assembly which is made up of a reduced number of components; which is quickly and easily assembled so as to materially reduce production costs; and which results in a rugged construction well adapted to meet conditions of hard usage.

Other objects of this invention will in part be obvious and in part hereinafter pointed out.

In the drawing,

Fig. 2 is a side elevational view thereof with parts in section;

Fig. 3 is a top plan view thereof;

Fig. 4 is a side elevational view thereof;

Fig. 5 is a transverse sectional view of the assembly;

Fig. 6 is a front elevational view of the crankshaft portion of the assembly;

Fig. 7 is a vertical sectional view thereof;

Figure 1:
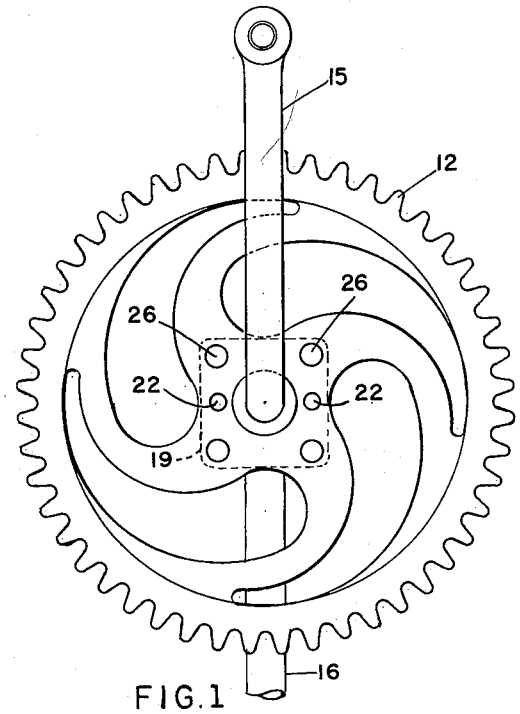
Fig. 1 is a front elevational view of a sprocket wheel assembly embodying the invention.
Figures 8, 9, 11:
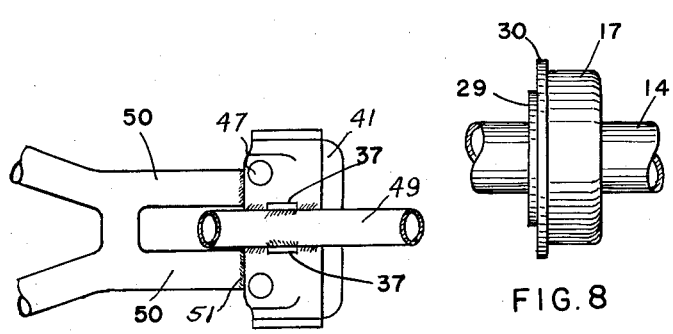
Fig. 8 is a side elevational view of a bearing unit.
Fig. 9 is a front elevational view thereof.
Fig. 11 is a top plan view thereof.

Referring in detail to the drawing, 10 designates a pedal sprocket wheel assembly embodying the invention. The same essentially comprises a pedal crank 11, a sprocket wheel 12 and a bearing assembly 13.

The crank 11 is formed from a cylindrical rod of steel, originally in rectilinear form and cut to required length. Such rod is bent to form the intermediate crank shaft portion 14 and the oppositely disposed crank arms 15, 16 which are formed at their ends to receive pedal assemblies, not shown.

While the crank 11 is still in its rectilinear rod form, before the bending operations which form crank arms 15, 16; there is mounted thereon a pair of similar, opposed ball bearing units generally indicated at 17, 18, which form a part of bearing assembly 13; and a square sprocket wheel mounting plate 19 having a central opening 20 to pass said rod. The rod already has been formed on an intermediate portion corresponding to one end of crank shaft portion 14 with slightly raised projections 21 which provide stop means for limiting the axial position of bearing unit 17.

The mounting plate 19 has pressed out of one face thereof a pair of projections 22 diametrically related to plate opening 20 and equidistant from the center thereof. The plate 19 is secured to an intermediate portion of the rod forming crank 11 at a point adjacent the other end of crank shaft portion 14, as by welding indicated at 23.

The sprocket wheel 12 is formed with a central opening 24 larger than the diameter of crank shaft portion 14, whereby the sprocket wheel may be slipped over crank arm 16 and brought into abutting relation to plate 19. The sprocket wheel 12 has previously been formed with a pair of diametrically aligned openings 25 equidistant from the center of opening 24 and adapted to receive plate projections 22, whereby sprocket wheel 12 is coaxially related to shaft portion 14. The wheel 12 is fixed to plate 19 by rivets 26 which may be located at the corners of plate 19.

The ball bearing units 17, 18 are each made up of an inner annular member 27 and an outer annular member 28 with the ball bearings, not shown, carried between said inner and outer members, in a manner known in the art. The inner bearing members 27 include an outwardly projecting annular hub portion 29 while the outer members 28 include an annular radial flange 30 on the outer edges thereof.

The bearing assembly 13 further includes a bearing housing 31 of generally cylindrical chape and comprising split semicylindrical sections 32, 33. The upper section 32 has a top wall portion 34 thereof formed with an opening 35 located intermediate the wall ends 36; a pair of opposed, upstanding, parallel welding ears 37 integral with wall portion 34 extend transversely of the section 32 at opposite sides of opening 35.

Upper housing section 32 has extending rearwardly from opening 35 a flat top wall portion 38 terminating at the opposite ends thereof somewhat short of wall ends 36. Extending downwardly from top wall portion 38 is a flat end wall portion 39 terminating at longitudinal edge 40 of section 32. Housing section 32 further includes a forwardly disposed, outwardly extending longitudinal flange 41 with a pair of longitudinally spaced slots 42 formed immediately above said flange.

Lower housing section 33 includes a bottom wall portion 43 with a rearwardly extending flat bottom wall portion 44 disposed substantially in parallel relation to top wall portion 38, and also terminating at the opposite ends thereof somewhat short of wall ends 36a. Extending upwardly from bottom wall portion 44 is a flat end wall portion 45 having a longitudinal upper edge 40a substantially abutting edge 40 of section 32. Housing section 33 further includes a pair of forwardly disposed, outwardly extending tongues 46 receivable in slots 42 of section 32 to hingedly connect sections 32, 33 together.

Housing sections 32, 33 are arranged with their wall ends 36, 36a in butting relation to flanges 30 on ball bearing units 17, 18, thereby maintaining said units in spaced relation on shaft portion 14; the hub portion 29 of unit 17 abutting stop means 21 while hub portion 29 on unit 18 abuts mounting plate 19.

Housing sections 32, 33 are retained in their hinged relation by means of a pair of bolts 47 received in aligned openings formed in opposed section wall portions 38, 44; nuts 48 on said bolts abutting wall portions 44.

Figure 10:
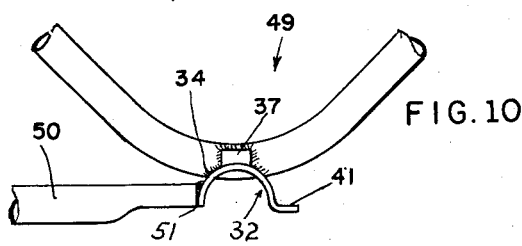
Fig. 10 is a side elevational view of a frame portion of the bicycle in association with one of the housing elements.

With split bearing housing 31, the upper housing section 32 may be preassembled with frame elements of the bicycle, as shown in Fig. 10. Thus, the usual tubular lower frame portion 49 is located in opening 35 of section 32 and welded in place between ears 37. The usual, horizontal pair of frame elements 50 have their forward ends welded to flat end wall 39 of housing section 32, as at 51.

Thereafter, the sprocket wheel-crank assembly may be readily associated with housing section 32 by means of lower section 33 which is hinged to section 32 with bearing units 17, 18 spread apart on shaft portion 14. The bolts 47 allow for quick assembly operations.

It will be apparent that sprocket wheel 12 is securely mounted on crank shaft portion 14 by means of the pre-welded mounting plate 19, thus avoiding the application of welding heat to the sprocket wheel and the operational difficulties inherent in welding. Also, the ball bearing units 17, 18 in conjunction with housing 31 eliminates the need for threading the crank shaft and nuts for holding the several elements of the conventional bearing assembly, in place on said shaft.

As various changes might be made in the embodiment of the invention herein shown, without departing from the spirit thereof, it is understood that all matter shown or described shall be deemed illustrative and not by way of limitation except as set forth in the appended claims.

Having thus disclosed my invention, I claim as new and desire to protect by Letters Patent:

1. A velocipede sprocket wheel assembly comprising a crank including a crank shaft portion and a pair of integral crank arms respectively extending from the opposite ends of said shaft portion, a sprocket wheel mounting plate extending transversely of said shaft portion adjacent one of said crank arms, a weldment securing said plate to said shaft portion, a sprocket wheel coaxially related to said shaft portion and independent thereof, said sprocket wheel being located between said plate and said one crank arm, means securing abutting portions of said plate and sprocket wheel together at points radially spaced from said shaft portion, a bearing assembly comprising a pair of opposed bearing units slidably mounted on said shaft portion, one of said bearing units abutting said mounting plate, means on said shaft portion adjacent the other crank arm for limiting the outward movement of the other bearing unit, and bearing housing means between and engageable with said bearing units for maintaining said units in spaced relation.

2. An assembly as in claim 1, wherein said housing means comprises a pair of opposed substantially semi-cylindrical portions, disconnectable means for hinging said housing portions together along one longitudinal edge thereof, and means for holding said housing portions in hinged relation.

3. An assembly as in claim 2 each of said bearing units including a cylindrical portion and a radial flange portion at one end of the cylindrical portion, the opposite ends of said housing portions being seated on said cylindrical bearing portions and abutting said bearing flange portions.

4. A velocipede sprocket wheel assembly comprising a crank including a crank shaft portion and a pair of crank arms integral with said shaft portion and respectively extending in opposite directions from opposite ends thereof, a sprocket wheel mounting plate having a central opening for passing said shaft portion fixed on said shaft portion adjacent one of said crank arms, a sprocket wheel having a central opening larger than the diameter of said shaft portion, means for locating said sprocket wheel in abutting relation to said plate and in coaxial relation to said shaft portion, means for securing said sprocket wheel to said plate, a pair of similar, unitary bearing units slidably mounted on said shaft portion, stop means on said shaft portion adjacent the other of said crank arms, and substantially cylindrical housing means having opposite end portions thereof engageable with said bearing units for maintaining said units in spaced relation on said shaft portion, one bearing unit abutting said stop means and the other bearing unit abutting said plate, said housing means comprising a pair of semi-cylindrical sections and means for detachably connecting said sections together.

5. An assembly as in claim 4 wherein said locating means comprises a pair of diametrically opposed openings formed in said sprocket wheel and equidistant from the center thereof, and a pair of projections extending from one face of said plate, said projections being diametrically related to the opening in said plate and equidistant from the center thereof, said projections being received in the opposed openings in said sprocket wheel.

6. A velocipede sprocket wheel assembly comprising a unitary crank having a crank shaft portion and bent crank arms integral therewith, said shaft portion and crank arms being of the same diameter, a sprocket wheel mounting plate having a central opening of a size equal to the diameter of said shaft portion for location on said shaft portion previous to the formation of said bent crank arms, said plate being located adjacent one crank arm, a weldment fixing said plate on said shaft portion, a sprocket wheel having a central opening larger than the diameter of said shaft portion for passing the juncture of said shaft portion and one bent crank arm, said sprocket wheel being located on said shaft portion in abutting relation to said plate, cooperating means on said plate and said sprocket wheel for coaxially locating said sprocket wheel relative to said shaft portion, rivet means securing said sprocket wheel to said plate, the peripheral edge of the central opening in said sprocket-wheel extending about said weldment.

7. An assembly as in claim 6 and further including a pair of similar unitary bearing units slidably mounted on said shaft portion in opposed relation, each of said bearing units having a radial, outwardly extending flange, one of said bearing units abutting said sprocket wheel mounting plate, means on said shaft limiting the outward movement of the other of said bearing units, means for maintaining said bearing units in spaced relation comprising bearing housing means, said housing means comprising a pair of substantially semi-cylindrical sections in detachably connected relation, the opposite end edges of said housing sections abutting the radial flanges of said bearing units.

8. An assembly as in claim 7 wherein one of said housing sections include flange means along one longitudinal edge thereof and a pair of longitudinally spaced slots formed immediately above said flange means, the other housing section including a pair of longitudinally spaced tongues projecting from one longitudinal edge thereof and receivable in the slots of the other housing section for interconnecting said sections, and means on said sections adjacent the other longitudinal edges thereof for holding said interconnected sections together.

References Cited in the file of this patent

UNITED STATES PATENTS

| | | |
|---|---|---|
| 359,609 | Jeffery | Mar. 22, 1887 |
| 564,958 | Holmes | July 28, 1896 |
| 599,652 | Ferris et al. | Feb. 22, 1898 |
| 625,038 | Kolb et al. | May 16, 1899 |
| 1,398,327 | Keller et al. | Nov. 29, 1921 |
| 2,593,347 | Roe et al. | Apr. 15, 1952 |
| 2,798,739 | Schreckengost el al. | July 9, 1957 |

FOREIGN PATENTS

| | | |
|---|---|---|
| 431,528 | Great Britain | July 10, 1935 |